Dec. 13, 1955 M. W. SLATE 2,727,148

ULTRA HIGH FREQUENCY TUNER

Filed Aug. 31, 1951 2 Sheets-Sheet 1

INVENTOR.
MATTHEW W. SLATE
BY Darby & Darby
ATTORNEYS

Dec. 13, 1955 M. W. SLATE 2,727,148

ULTRA HIGH FREQUENCY TUNER

Filed Aug. 31, 1951 2 Sheets-Sheet 2

INVENTOR.
MATTHEW W. SLATE
BY Darby & Darby
ATTORNEYS

United States Patent Office 2,727,148

Patented Dec. 13, 1955

2,727,148

ULTRA HIGH FREQUENCY TUNER

Matthew W. Slate, New York, N. Y., assignor to Allen B. Du Mont Laboratories, Inc., Clifton, N. J., a corporation of Delaware Application August 31, 1951, Serial No. 244,626

4 Claims. (Cl. 250—40)

This invention relates to tuning devices for radio frequencies and particularly to such devices for ultra high frequencies.

Objects of the invention are to provide a tuner for radio frequencies having a wide tuning range, improved stability, compact construction, and without necessity for sliding contacts.

Another object is to provide a tuner in which both inductance and capacitance are changed within the tuning range.

A still further object is to provide a tuner wherein the inductance may be changed more than the capacitance throughout the tuning range.

Another object is to provide multiple-ganged tuning units to tune simultaneously oscillators, detectors, R. F. stages, and the like in a predetermined coordinated manner.

Other objects will be apparent.

Figure 1:
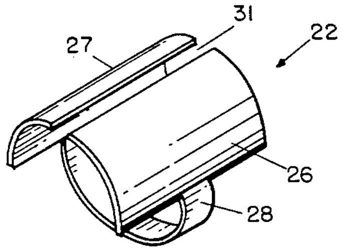
Figure 1 is a perspective view of a stator of a preferred embodiment of the invention.
Figure 2:
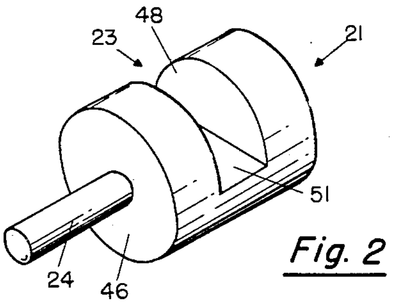
Figure 2 is a perspective view of a rotor of the preferred embodiment.

Referring principally to Figures 1, 2, 3, 4, and 11, the tuner comprises a rotor member 21 concentrically positioned within a cylindrically shaped stator member 22. The rotor member 21 comprises a cylindrically shaped or elongated conductive member having a non-conductive portion which may consist of a slot or opening, and a tuning shaft 24 attached thereto. The non-conductive portion 23 is preferably formed in the shape of a transverse slot; alternative embodiments will be disclosed hereafter. The stator member 22 comprises an open or unclosed loop, preferably having a generally cylindrical shape, formed from conductive material and comprises capacitance areas 26 and 27 and a strap 28 extending therebetween. The capacitance areas and strap preferably form a thin-walled hollow cylinder having a circular cross sectional shape. A longitudinal slit 31 serving as the opening to create the unclosed loop 22, extends along and between the capacitance areas 26 and 27.

The conductive portions of the stator and rotor members are preferably constructed of silver, plated or otherwise attached to supporting members. A suitable material for a supporting member is glass-bonded mica. The rotor and stator may also be made from solid conductive material such as copper or aluminum. The rotor and stator members should preferably have a low coefficient of expansion with respect to temperature.

Figures 11, 12, 13, 14, 15, 16, 17, 18, 19:
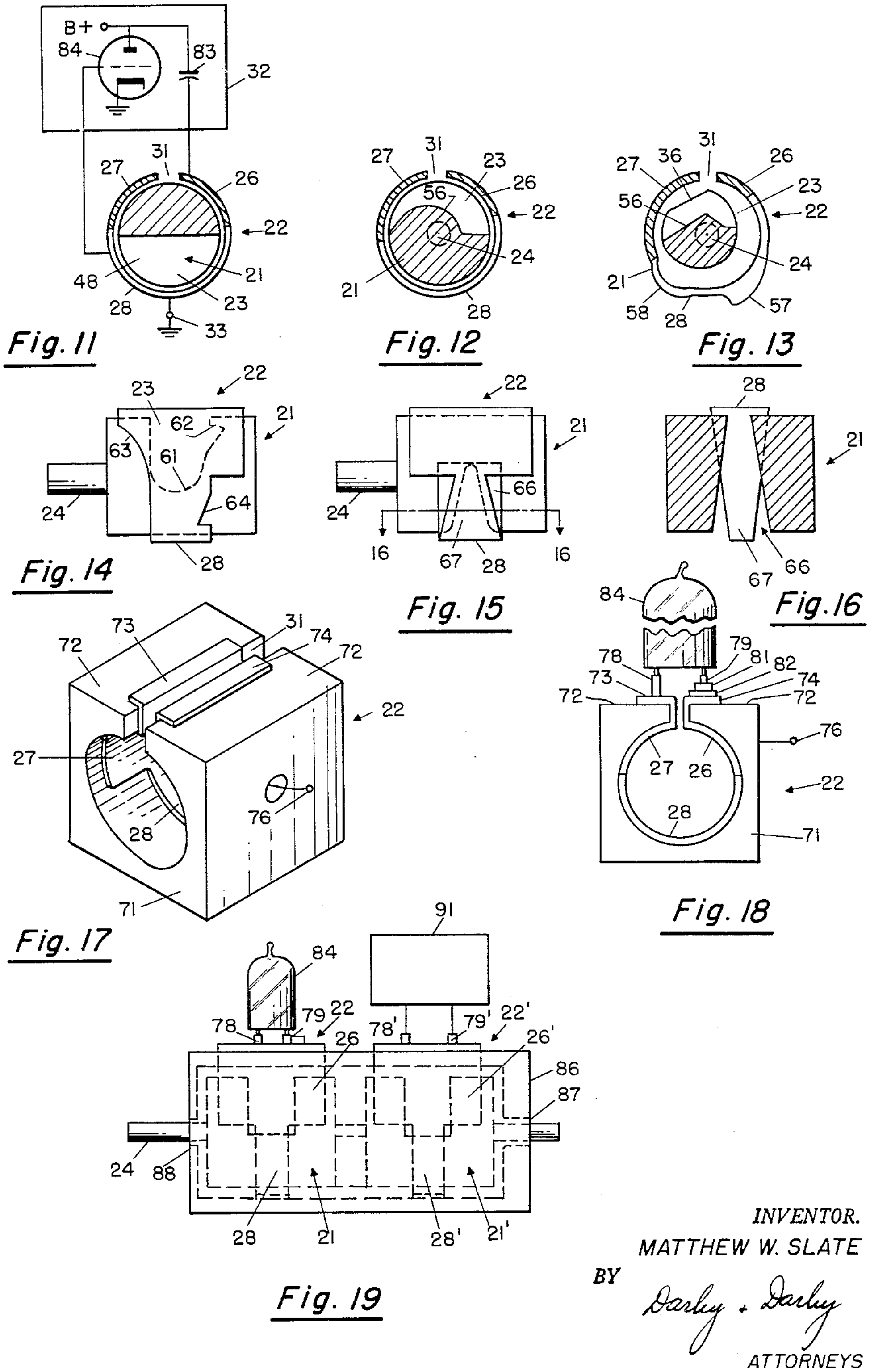
Figure 11 is a cross-sectional view of Figure 4 along the sectional line 11—11.
Figures 12 and 13 show alternative embodiments of the tuner shown in Figure 11.
Figure 14 is similar to Figure 3, with additional embodiments for tracking purposes.
Figure 15 is an elevational view of a further embodiment of the invention.
Figure 16 is a longitudinal sectional view of Figure 15 taken on the line 16—16.
Figures 17 and 18 show details of a practical construction of the stator.
Figure 19 shows a plurality of tuning units connected together.

Electrical circuits 32 (Figure 11) may be connected to the capacitance areas 26 and 27 and to the strap 28. Such an electric circuit may be, for example, an oscillator, amplifier, or mixer circuit in which the herein described tuning element is employed as a tunable reactance device. At high frequencies it is sometimes found desirable to mount a crystal detector or mixer, or a thermionic tube holder or socket directly upon and attached to the capacitance areas 26 and 27 or strap 28 as shown in Figures 11, 18 and 19. The points on the strap or capacitance areas to which external circuits are attached, will depend on various well-known factors such as circuit conditions, desired impedance matching, etc. Additional connections may be made to the stator strap as indicated by the numeral 33 in Figure 11.

Figure 4:
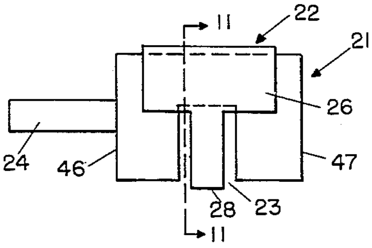

The transverse slot 23 in the rotor 21 is preferably greater in width than the strap 28, as shown in Figure 4.

The tuner, as has been thus far described, functions as follows:

An electrical path exists from one capacitance area 26 through the strap 28 to the other capacitance area 27. When the rotor is set to the position shown in Figure 3, the inductance of the strap 28 is minimized due to a shielding or short-circuiting action of the rotor upon the strap, and the capacitance from one capacitance area to the other through the stator is minimized because of the presence of the opening 23. In this position, the tuning device is tuned to a highest or maximum frequency, since the inductance and capacitance thereacross are at minimum values. It is to be understood that this has been a simplified description; actually, the inductance and capacitance are distributed throughout the device and function in a more complicated manner.

Figure 3:
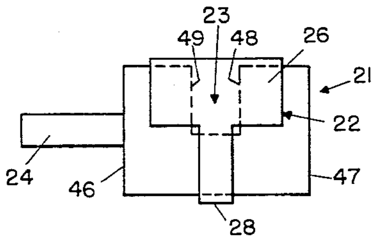
Figures 3 and 4 are side elevational views of a tuner adjusted for maximum resonance frequency and minimum resonance frequency, respectively.

When the rotor is set to the position shown in Figure 4, the inductance of the tuner is maximum. The strap 28 not being shielded and electrically short circuited by the rotor 21 as is the case for adjustment shown in Figure 3, provides a maximum inductance. Also, a maximum capacitance is provided between the capacitance areas 26 and 27 because the rotor 21 provides a full surface area adjacent both capacitance areas. Thus, the device is tuned to a lowest or minimum frequency because the inductance and capacitance thereacross have maximum values.

Figures 5, 6, 7:
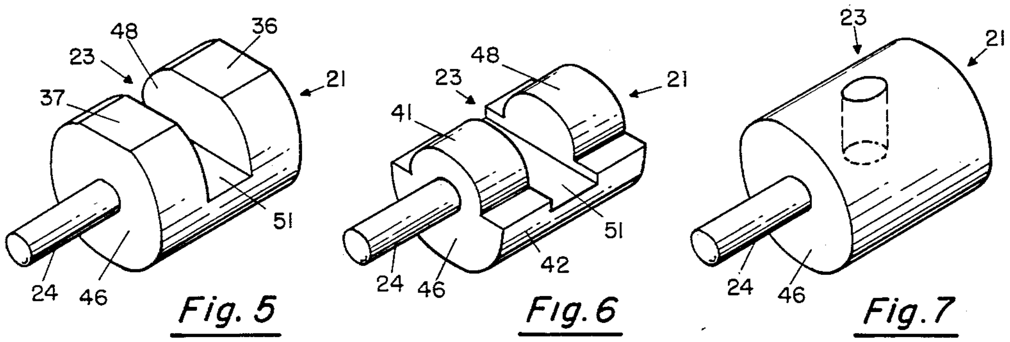
Figures 5 to 10 are alternative embodiments of the rotor shown in Figure 2.

The alternative embodiments of the rotor, shown in Figures 5 through 10 are for the purpose of affecting the rate of tuning or tracking, and range of tuning of the device. Figure 5 is similar to the rotor already described and shown in Figure 2, except that flat portions 36 and 37 are provided on the surface of the rotor.

Figure 6 shows a rotor construction wherein parts of the surface lie on different radii from the axis. For instance, the portion of the surface indicated by numeral 41 is located on a shorter radius than is the portion of the surface indicated by the numeral 42.

In the embodiment of Figure 7, the non-conductive portion 23 is in the form of an opening preferably extending radially inwardly from the surface of the rotor 21.

Figures 8, 9:
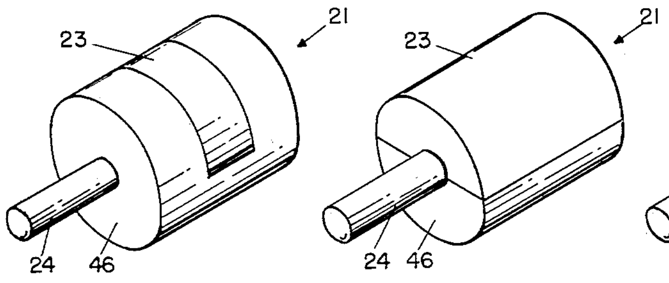

Figure 8 shows the construction of a rotor having a solid surface of insulative material over part of which there is plated, or otherwise attached, a conductive coating, leaving a non-conductive portion 23 which is electrically equivalent to a slot or opening.

Figure 9 shows a construction similar to that of Figure 8, except that the non-conductive portion 23 extends substantially along the entire length of the rotor.

Figure 10:
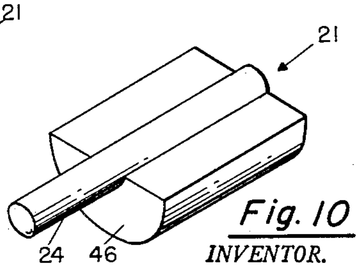

The construction of Figure 10 is electrically similar to that of Figure 9; mechanically, however, it is formed from a semicylinder of solid conductive material, or conductively coated material, to which the shaft 24 is attached.

If the rotor is constructed of a conductive material attached to the surface of an insulative body, certain portions of the insulative body need not be plated. Vertical surfaces normal to the longitudinal axis such as the ends 46 and 47 and the sides 48 and 49 of slot 23 need not be conductive.

For tracking purposes, the rate of tuning can be varied by several means. A method of achieving tracking by means of flattened surface portions of the rotor and by means of different surface radii of the rotor have been described in connection with Figures 5 and 6. In Figure 12, a rotor 21 is shown having a transverse slot therein, of which the bottom surface 56 is electrically conductive and is shaped so that its surface passes through radii of different lengths from the axis of the rotor. The embodiment of Figure 13 shows a rotor 21 having flattened surface portions 36, as described in connection with Figure 5, and having a transverse slot 23, the bottom 56 of which is conductive and shaped in an irregular manner to aid in achieving proper tracking. In addition to these features, further tracking effect is achieved by means of the rotor 21 being axially offset from the axis of the turning shaft 24. The stator 22 is shown as having a capacitive portion 27 extending over a greater surface periphery than does the remaining capacitive portion 26. This construction is useful in effecting tracking and tuning range. The strap 28 of the stator 22 has a portion 57 thereof thicker than the remaining portions of the strap. Also, the strap may contain a bulge, or extended radius portion 58. These features effect the rate of tuning, or tracking, of the device.

Still other means of tracking are shown in the construction of Figure 14 in which the rotor is shown to have a transverse slot 23 having a rounded bottom 61 and a tapered sider wall 62. The stator 22 is shown to have a tapered capacitive portion 63 and a tapered shape 64 in the strap 28.

Figures 15 and 16 show a rotor and stator construction wherein the rotor slot 66 is tapered transversely and the stator strap 67 is also tapered transversely. Althrough these transverse tapers are shown as being in respective opposite directions, certain design considerations might dictate the transverse tapering of only one of these elements, or they may both be tapered in the same direction. The shape and type of taper is dependent upon the tracking characteristics desired. The longitudinal slit 31 in the stator 22 may be skewed or twisted in order to effect the tracking characteristics of the device.

In the preferred stator construction shown in Figures 17 and 18 a supporting body 71, preferably made from insulative material, such as glass-bonded mica, has a generally cylindrical opening therein onto the surface of which is plated or otherwise fastened a conductive material shaped to form the stator element of the tuning device. The conductive material may extend through a slot 31 and onto the outer surface 72 of the supporting body 71 in order to form terminal areas 73 and 74. Electric leads 76 may extend through openings in the supporting body 71 and may be connected to a capacitance area 26 or 27, or to the strap 28.

In Figure 18 there is shown a preferred construction for a tube socket wherein one receptacle of the socket is directly attached and connected to one of the terminal areas 73. Another receptacle 79 may be connected to the terminal area 74 by means of a capacitance formed with the terminal area 74 as one plate thereof, a conductive member 81 as another plate thereof, and an insulative member 82 positioned between the capacitance plates 74 and 81. The receptacle 79 may be attached directly to the capacitance plate 81. These elements forming the capacitance may be attached together by means of adhesive or screws or rivets and the like. This novel socket construction provides an electric capacitance 83 shown in the electric circuit 32 of Figure 11. The receptacles 78 and 79 may be positioned to receive pins of a thermionic tube 84.

In Figure 19, several tuning units are shown connected together in tandem with the rotor members 21 and 21' positioned in a housing member 86 having bearing surfaces 87 and 88 for the tuning shaft 24. One of the tuning elements may be connected to electric circuits 91.

From the various embodiments of the invention which have been shown and described, it will be apparent that the essential desideratum is to provide a rotor member having a portion of the surface thereof electrically conductive and positioned to rotate adjacent a surface provided by a loop-shaped stator member.

While preferred embodiments of the invention have been described, it will be apparent that certain changes may be made which will be within the scope thereof as defined by the appended claims. For instance, the rotor member may be maintained in fixed position and the stator member may be made to move with respect thereto. Also, the rotor member may be in the form of a loop positioned within the stator member. Various alternative means for mounting and supporting the rotor and stator members, and circuit elements, will be evident to those who practice the teachings herein.

What is claimed is:

1. An electrical tuning device comprising a stator member and a rotor member mutually positioned in substantial axial alignment, said stator member being electrically conductive and shaped approximately in the form of a hollow cylinder having a wall and having a longitudinal slit along the entire length of said wall and having a strap portion comprising a shortened longitudinal section of said wall, said rotor member comprising a generally cylindrical surface part of which is electrically non-conductive, said non-conductive surface being a slot transverse with respect to the axis of rotation and positioned substantially in axial alignment with said strap, means for relatively rotating said rotor and stator, and means for connecting electrical circuits to said stator member.

2. The device of claim 1 in which said transverse slot has a longitudinal length greater than the longitudinal length of said strap.

3. The device of claim 1, in which said transverse slot has an irregular shape whereby tracking is achieved.

4. An electrical device comprising electric circuits having two terminals connected to a resonant device, said resonant device comprising a first and a second conductive members having generally cylindrical shapes, said first member being hollow and having a longitudinal slit along the length thereof and a strap portion on the circumference thereof longitudinally shorter than said length, said second member being positioned within the confines of and axially rotatable with respect to said first member and having a transverse slot therein in substantial longitudinal alignment with said strap portion, and electrical connections between said two terminals and said first conductive member.

References Cited in the file of this patent

UNITED STATES PATENTS

| | | |
|---|---|---|
| 2,367,681 | Karplus et al. | Jan. 23, 1945 |
| 2,395,520 | Toth | Feb. 26, 1946 |
| 2,482,393 | Wilburn | Sept. 20, 1949 |
| 2,483,893 | Everett | Oct. 4, 1949 |
| 2,491,480 | Davis et al. | Dec. 20, 1949 |
| 2,575,199 | Stutt | Nov. 13, 1951 |
| 2,578,429 | Karplus | Dec. 11, 1951 |